(12) United States Patent
Äärilä et al.

(10) Patent No.: US 7,524,897 B2
(45) Date of Patent: *Apr. 28, 2009

(54) FILM WITH HIGH IMPACT STRENGTH

(75) Inventors: Jari Äärilä, Porvoo (FI); Marja Ora, Vantaa (FI); Tuula Sivonen, Helsinki (FI); Markku Vahteri, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/503,611

(22) PCT Filed: Feb. 3, 2003

(86) PCT No.: PCT/EP03/01042

§ 371 (c)(1),
(2), (4) Date: Jan. 24, 2005

(87) PCT Pub. No.: WO03/066698

PCT Pub. Date: Aug. 14, 2003

(65) Prior Publication Data

US 2005/0119407 A1    Jun. 2, 2005

(30) Foreign Application Priority Data

Feb. 4, 2002    (EP) .................... 02002578

(51) Int. Cl.
*C08L 23/08* (2006.01)
*C08F 297/08* (2006.01)

(52) U.S. Cl. ............... 525/53; 525/240; 526/64; 526/65; 526/348; 526/348.1

(58) Field of Classification Search ............ 525/53, 525/240; 526/64, 65, 348, 348.1
See application file for complete search history.

(56) References Cited

U.S. PATENT DOCUMENTS

| 5,718,974 A | 2/1998 | Kmiec |
| 5,814,413 A * | 9/1998 | Beerwart .................... 428/516 |
| 2006/0177675 A1* | 8/2006 | Lehtinen et al. ............ 428/461 |
| 2008/0139749 A1* | 6/2008 | Lehtinen et al. ............ 525/240 |

FOREIGN PATENT DOCUMENTS

| EP | 0 517 868 B | 11/1995 |
| EP | 0 916 693 A | 5/1999 |
| EP | 1 146 079 A | 10/2001 |
| WO | WO 97 03124 A | 1/1997 |

OTHER PUBLICATIONS

International Search Report correspondence to International Application No. PCT/EP/03/01042, May 2003.

* cited by examiner

*Primary Examiner*—Roberto Rábago
(74) *Attorney, Agent, or Firm*—Fay Sharpe LLP

(57) ABSTRACT

A film with a broad molecular weight distribution, excellent impact strength and a high dart drop value or moderate dart drop value accompanied by good optical property consisting of a bimodal terpolymer comprising a low molecular weight homopolymer of ethylene and a high molecular weight terpolymer of ethylene, 1-butene and a C6 to C12 alpha-olefin, or a bimodal terpolymer comprising a low mo-lecular weight polymer which is a binary copolymer of ethylene and a C4 to C12 alpha-olefin and a high molecular weight polymer which is either a binary copolymer of ethylene and 1-butene, if the low molecular weight polymer is a binary co-polymer of ethylene and a C6 to C12 alpha-olefin, or a terpolymer of ethylene, 1-butene and a C6 to C12 alpha-olefin.

39 Claims, No Drawings

FILM WITH HIGH IMPACT STRENGTH

The present invention relates to a film with good mechanical properties, in particular to a film of a bimodal terpolymer with a good impact strength.

Bimodal ethylene polymers are well known and can be used for many applications as pressure pipes, cable jacketing, wire coating, pipe coating, blow moulding and films.

Such polymers consist in general of two polymers one having a relatively high molecular weight and one having a relatively low molecular weight. The properties of these polymers are a good tensile strength, a high ultimate elongation, a good puncture resistance and a good impact strength.

Document EP-0 369 436 A2 is related to a process for the in-situ blending of polymers comprising continuously contacting under polymerisation conditions, a mixture of ethylene and at least one α-olefin having at least three carbon atoms. The final polymer comprises a low melt index copolymer and a high melt index copolymer whereby both copolymers consist of ethylene and an α-olefin. The document is related to a process and does not show any specific reasons why the polymers would be useful in manufacturing films.

Document EP-0 435 624 A1 provides a low density polyethylene having a relatively broad molecular weight distribution and therefore good processability at high molecular weights. The polymer used as a film is produced by blending the first polymer component of high molecular weight with a second polymer component of low molecular weight, whereby both polymer components having substantially the same melt index corrected density or a dissimilar corrected density.

Document EP-0 691 367 B1 is related to an extruded film of ethylene copolymers prepared in a series of polymerisation reactors, whereby a high molecular weight fraction consists of a copolymer of ethylene and α-olefin comonomer(s) having 5 to 12 carbon atoms and a low molecular weight fraction consists of a copolymer of ethylene, 1-butene and optionally an α-olefin comonomer(s) having 3 to 12 carbon atoms.

Document WO-97/49476 is related to cable constructions, particularly jacketing for telecommunication cables. Best mechanical results for such cable jackets can be obtained when 1-butene is used as a comonomer in the low molecular weight fraction and 1-hexene in the high molecular fraction or vice versa. The prior art document WO-97/49476 does not disclose films and properties that are important in the production.

An improvement of impact strength is still desirable.

It is therefore an object of the present invention to provide a film with a high impact strength, especially a film with a high dart drop value, or alternatively a film with moderate dart drop value and simultaneously having good optical properties.

The present invention is based on the finding that these objects can be solved by a film of a bimodal terpolymer comprising a low molecular weight polymer which contains at least ethylene and a high molecular weight polymer which is a binary copolymer or a terpolymer depending on the composition of the low molecular weight polymer.

More precisely, the object is solved by a film which consists of either a bimodal terpolymer comprising
  a) a low molecular weight homopolymer of ethylene and
  b) a high molecular weight terpolymer of ethylene, 1-butene and a $C_6$ to $C_{12}$ α-olefin, or a bimodal terpolymer comprising
  a) a low molecular weight polymer which is a binary copolymer of ethylene and a $C_4$ to $C_{12}$ α-olefin and
  b) a high molecular weight polymer which is either a binary copolymer of ethylene and 1-butene, if the low molecular weight polymer of a) is a binary copolymer of ethylene and a $C_6$ to $C_{12}$ α-olefin, or a terpolymer of ethylene, 1-butene and a $C_6$ to $C_{12}$ α-olefin.

In a first and second embodiment the present invention provides a film of a bimodal, high molecular weight terpolymer with at least a broad molecular weight distribution and excellent impact strength, especially a film with at least a high dart drop value, and in a third embodiment the present invention provides a film of a bimodal, medium molecular weight terpolymer with a relatively narrow molecular weight distribution and moderate dart drop value accompanied by good optical property.

Furthermore, the present invention provides a process for producing the film of a bimodal terpolymer with the above mentioned properties.

In the following all three embodiments will be explained in more detail.

The film of the first embodiment is a bimodal, high molecular weight terpolymer with a very broad molecular weight distribution whereby its remarkable feature is the excellent impact strength, especially a film with a very high dart drop value. A film with such properties is characterized in that the film consists of either a bimodal terpolymer comprising
  a) a low molecular weight homopolymer of ethylene and
  b) a high molecular weight terpolymer of ethylene, 1-butene and a $C_6$ to $C_{12}$ α-olefin, or a bimodal terpolymer comprising
  a) a low molecular weight polymer which is a binary copolymer of ethylene and a $C_4$ to $C_{12}$ α-olefin and
  b) a high molecular weight polymer which is either a binary copolymer of ethylene and 1-butene, if the low molecular weight polymer of a) is a binary copolymer of ethylene and a $C_6$ to $C_{12}$ α-olefin, or a terpolymer of ethylene, 1-butene and a $C_6$ to $C_{12}$ α-olefin.

The expression of modality of a polymer refers to the form of its molecular weight distribution (MWD) curve, i.e. the appearance of the graph of the polymer weight fraction as a function of its molecular weight. If the polymer is produced in a sequential step process i.e. by utilizing reactors coupled in series and using different conditions. in each reactor, the different polymer fraction produced in the different reactors will each have their own molecular weight distribution which may considerably differ from each another.

The molecular weight distribution curve of the resulting final polymer can be looked at as the superposition of the molecular weight distribution curve of the polymer fractions which will accordingly show two or more distinct maxima or at least be distinctly broadened compared with the curves of the individual fractions. A polymer showing such a molecular weight distribution curve is called bimodal or multimodal, respectively.

Multimodal, especially bimodal, polymers can be produced according to several processes which are described e.g. in EP-0 517 868 B1 or WO-A-96/18662.

The multimodal polyethylene preferably is produced in a multi-stage process in a multi-step reaction sequence such as described in EP-0 517 868 B1 and WO-A-96/18662. The contents of these documents are included herein by reference.

In this process, in a first step ethylene is polymerized in a loop reactor in the liquid phase of an inert low boiling hydrocarbon medium. Then the reaction mixture is discharged from the loop reactor and at least the inert hydrocarbon medium is removed from the reaction mixture and the polymers transferred into one or more gas phase reactors where the polymerisation is continued in the presence of gaseous ethylene. The multimodal polymer produced according to this process has a superior homogenity with respect to the distribution of the different polymer fractions which cannot be obtained e.g. by a polymer mix.

The catalyst for the production of the ethylene polymer may be e.g. a chromium, a Ziegler-Natta-type or a single-site catalyst.

Preferably, a Ziegler-Natta catalyst, like one of those disclosed in EP-A-0 688 794 and EP-A-0 949 274 or a single-site catalyst like one of those disclosed in WO-A-97/28170 is used.

Multimodal polymers, in particular ethylene polymers, show superior mechanical properties such as low shrinkage, low abrasion, hard surface and good barrier properties accompanied by a good processability.

The bimodal terpolymer according to the first embodiment comprises a low molecular weight fraction (LMW) of a homopolymer of ethylene or a binary copolymer of ethylene and a $C_4$ to $C_{12}$ α-olefin and a high molecular weight fraction (HMW) of a binary copolymer of ethylene and 1-butene if the low molecular weight polymer of a) is a binary copolymer of ethylene and a $C_6$ to $C_{12}$ α-olefin, or a terpolymer of ethylene, 1-butene and a $C_6$ to $C_{12}$ α-olefin.

The expression "homopolymer of ethylene" used herein refers to a polyethylene that consists substantially, i.e. to at least 98% by weight, preferably at least 99% by weight, more preferably at least 99.5% by weight, most preferably at least 99.8% by weight of ethylene.

The impact strength characterizes the material behaviour and a high speed loading (impact). Pendulum and falling weight type testers are applied here. Specimen can be either plaques, notched or unnotched bars or parts of finished products. There are several impact methods like "Charpy impact test", "Izod impact test", "tensile impact test", "instrumented puncture test" and the "dart drop test". Generally, an impact test shows the energy which is needed to break or puncture specimen under specified conditions. By the dart drop test the dart drop value is determined to verify the impact strength of a film. A free-falling dart of specific weight and geometry is therefore from a specified height dropped onto a film. The weight at which 50% of the film samples break is reported as the dart drop value. All dart drop values are measured by method ISO 7765-1.

The film according to the first embodiment if extruded on a Collin film line into a thickness of 25 μm with a die diameter of 30 mm, a die gap of 0.75 mm, a BUR (blow-up ratio) of 3.2 and a frost line height of 160 mm, has a dart drop value preferably of at least. 1,400 g, more preferably of at least 1,500 g and most preferably of at least 1,700 g.

The bimodal terpolymer composition comprises, as stated above, a low molecular weight copolymer fraction and a high molecular weight copolymer fraction. The low molecular copolymer fraction contains, provided that a binary copolymer is used, a $C_4$ to $C_{12}$ α-olefin. Preferably, the $C_4$ to $C_{12}$ α-olefin of the low molecular weight copolymer fraction is selected from the group of 1-butene, 1-hexene, 4-methyl-1-pentene, 1-octene and 1-decene. The $C_6$ to $C_{12}$ α-olefin of the high molecular weight copolymer fraction is preferably selected from the group of 1-hexene, 4-methyl-1-pentene, 1-octene and 1-decene.

The weight average molecular weight of the bimodal terpolymer is preferably between 190,000 to 400,000 g/mol, more preferably between 200,000 to 300,000 g/mol. The low molecular weight polymer fraction has a weight average molecular weight preferably of 4,500 to 55,000 g/mol, more preferably of 5,000 to 50,000 g/mol and the high molecular weight polymer has a weight average molecular weight preferably of 450,000 to 1,000,000 g/mol, more preferably of 500,000 to 1,000,000 g/mol.

The molecular weight distribution of the polymer is further characterized by the way of its melt flow rate (MFR) according to ISO 1133 at 190° C. The melt flow rate is preliminary depending on the mean molecular weight. This is, because long, well-packed molecules give the material a lower flow tendency than short, less-packed molecules.

An increase in molecular weight means a decrease in MFR value. The melt flow rate is measured in g/10 min of the polymer discharge under a specified temperature and pressure condition and is a measure of the viscosity of the polymer, which in turn for each type of polymer is mainly influenced by its molecular weight distribution, but also by its degree of branching etc. The melt flow rate measured under a load 2.16 kg (ISO 1133) is denoted as $MFR_2$. In turn, the melt flow rate measured with 21.6 kg is denoted as $MFR_{21}$.

The final bimodal terpolymer has a melt flow rate $MFR_{21}$ preferably of 7 to 40 g/10 min, more preferably of 15 to 30 g/10 min. The low molecular weight polymer has a melt index $MFR_2$ preferably of 200 to 800 g/10 min, more preferably of 300 to 600 g/10 min.

The melt flow rate and the density of the material are decisive for strength properties, while the density only is decisive for the melting point, surface hardness, permeability and water absorption.

The density of the final bimodal terpolymer is preferably of 910 to 950 kg/$M^3$, more preferably of 915 to 940 kg/$m^3$. The density of the low molecular weight polymer is preferably of 940 to 980 kg/$m^3$, more preferably of 945 to 975 kg/$M^3$.

The film of the bimodal terpolymer according to the present invention, consists preferably in 30 to 60%, more preferably 35 to 50% and most preferably 38 to 45% by weight of low molecular weight copolymer with regard to the total composition.

The overall comonomer content in the total polymer is 1 to 7% by mol, preferably 2 to 6% by mol and in the low molecular weight polymer is the comonomer content 0 to 2.5% by mol, preferably 0 to 2% by mol. In the high molecular weight polymer is the comonomer content 2.5 to 11% by mol, preferably 3 to 10% by mol.

Further, the molecular weight of the high molecular weight copolymer fraction should be such that when the low molecular weight copolymer fraction has the melt index and density specified above, the final bimodal terpolymer has the melt index and density as discussed above.

In the following some preferred compositions are explicitly described.

It is preferred that the bimodal terpolymer has a melt flow rate $MFR_{21}$ of about 10 to 40 g/10 min and a density of 918 to 928 kg/$m^3$.

According to another preferred product, the bimodal terpolymer has a melt flow rate $MFR_{21}$ of about 7 to 30 g/10 min and a density of 930 to 940 kg/$m^3$.

According to one more preferred product, the bimodal terpolymer has a melt flow rate $MFR_{21}$ of about 7 to 20 g/10 min and a density of 940 to 950 kg/$m^3$.

Preferably, the bimodal terpolymer comprises a low molecular weight copolymer fraction consisting in a binary copolymer of ethylene and a $C_6$ to $C_{12}$ α-olefin and a high molecular weight copolymer fraction consisting in a binary copolymer of ethylene and 1-butene. The melt flow rate $MFR_{21}$ of the final bimodal terpolymer is of about 10 to 40 g/10 min and the density amounts to 918 to 928 kg/$m^3$, whereby the low molecular weight copolymer fraction has a melt flow rate $MFR_2$ of 200 to 500 g/10 min and a density of 945 to 955 kg/m³. The amount of the low molecular weight copolymer fraction is 38 to 43% of the total composition and the amount of high molecular weight copolymer is 57 to 62% of the total composition. A bimodal terpolymer with properties as stated in this paragraph has, as a film, a dart drop value preferably of at least 1400 g, more preferably of at least 1500 g, if the film is extruded on a Collin film line into a thickness of 25 µm, with a die diameter of 30 mm, a die gap of 0.75 mm, a BUR (blow-up ratio) of 3.2 and a frost line height of 160 mm.

In another preferred composition the bimodal terpolymer comprises a low molecular weight copolymer fraction consisting in a binary copolymer of ethylene and a $C_6$ to $C_{12}$ α-olefin and a high molecular weight copolymer fraction consisting in a binary copolymer of ethylene and 1-butene. The melt flow rate $MFR_{21}$ of the final bimodal terpolymer is about 7 to 30 g/10 min and the density amounts to 930 to 940 kg/m³, whereby the low molecular weight copolymer fraction has a melt flow rate $MFR_2$ of 200 to 800 g/10 min and a density of 955 to 965 kg/m³. The amount of the low molecular weight copolymer fraction is 38 to 43% of the total composition and the amount of high molecular weight copolymer fraction is 57 to 62% of the total composition.

In still another preferred composition the bimodal terpolymer comprises a low molecular weight copolymer fraction consisting in a homopolymer of ethylene or a binary copolymer of ethylene and 1-butene and a high molecular weight copolymer fraction consisting in a terpolymer of ethylene, 1-butene and a $C_6$ to $C_{12}$ α-olefin. The melt flow rate $MFR_{21}$ of the final bimodal terpolymer is about 7 to 30 g/10 min and the density amounts to 930 to 940 kg/m³, whereby the low molecular weight copolymer fraction has a melt flow rate $MFR_2$ of 200 to 800 g/10 min and a density of 955 to 975 kg/m³. The amount of the low molecular weight copolymer fraction is 38 to 43% of the total composition and the amount of high molecular weight copolymer fraction is 57 to 62% of the total composition.

The film of the second embodiment is a bimodal, high molecular terpolymer with a broad molecular weight distribution whereby its remarkable feature is the excellent impact strength, especially a film with a high dart drop value. Furthermore, the film of the second embodiment has higher stiffness and moisture properties than those of the first and third embodiment, due to the higher density of the film. A film with such properties is characterized in that the film consists of a bimodal terpolymer comprising
  a) a low molecular weight homopolymer of ethylene and
  b) a high molecular weight terpolymer of ethylene, 1-butene and a $C_6$ to $C_{12}$ α-olefin, The bimodal terpolymer of the second embodiment can be produced in the same manner as already described in the first embodiment. This relates also to the catalyst types which can be used.

The expression "homopolymer of ethylene" used herein refers to a polyethylene that consists substantially, i.e. to at least 98% by weight, preferably at least 99% by weight, more preferably at least 99.5% by weight, most preferably at least 99.8% by weight of ethylene.

Preferably, the $C_6$ to $C_{12}$ α-olefin is selected from the group of 1-hexene, 4-methyl-1-pentene, 1-octene and 1-decene.

The film according to the second embodiment if extruded on a Collin film line into a thickness of 25 µm, with a die diameter of 30 mm, a die gap of 0.75 mm, a BUR (blow-up ratio) of 3.2 and a frost line height of 160 mm, has a dart-drop value of at least 180 g, preferably of at least 200 g.

The weight average molecular weight of the bimodal terpolymer is between 240,000 to 500,000 g/mol, preferably 250,000 to 400,000 g/mol. The low molecular weight polymer fraction has a weight average molecular weight preferably of 4,500 to 55,000 g/mol, more preferably of 5,000 to 50,000 g/mol and the high molecular weight polymer has a weight average molecular weight preferably of 450,000 to 1,000,000 g/mol, more preferably of 500,000 to 1,000,000 g/mol.

The final bimodal terpolymer has a melt flow rate $MFR_{21}$ preferably of 2 to 25 g/10 min, more preferably of 3 to 20 g/10 min. The low molecular weight polymer has a melt index $MFR_2$ preferably of 300 to 1,200 g/10 min, more preferably of 300 to 600 g/10 min.

The density of the final bimodal terpolymer is preferably of 935 to 970 kg/m³, more preferably of 940 to 965 kg/m³. The density of the low molecular weight polymer is preferably of 970 to 980 kg/m³, more preferably of 972 to 978 kg/m³, most preferably 975 kg/m³.

The film of the bimodal terpolymer according to the present invention, consists preferably in 30 to 60%, more preferably 35 to 50% and most preferably 38 to 45% by weight of low molecular weight copolymer with regard to the total composition.

The overall comonomer content in the total polymer is 0.5 to 2.5% by mol, preferably 0.5 to 2.5% by mol and in the high molecular weight polymer is the comonomer content 0.5 to 3.5% by mol, preferably 0.7 to 3.0% by mol.

Further, the molecular weight of the high molecular weight copolymer fraction should be such that when the low molecular weight copolymer fraction has the melt index and density specified above, the final bimodal terpolymer has the melt index and density as discussed above.

It is preferred that the bimodal terpolymer has a melt flow rate $MFR_{21}$ of about 3 to 20 g/10 min and a density of 955 to 965 kg/m³.

In a preferred composition the bimodal terpolymer comprises a low molecular weight copolymer fraction consisting of a homopolymer of ethylene and a high molecular weight copolymer fraction consisting in a terpolymer of ethylene, 1-butene and a $C_6$ to $C_{12}$ α-olefin. The melt flow rate $MFR_{21}$ of the final bimodal terpolymer is about 3 to 20 g/10 min and the density amounts to 940 to 950 kg/m³, whereby the low molecular weight copolymer fraction has a melt flow rate $MFR_2$ of 300 to 1200 g/10 min. The amount of the low molecular weight copolymer fraction is 38 to 43% of the total composition and the amount of the high molecular weight copolymer fraction is 55 to 62% of the total composition. A bimodal terpolymer with properties as stated in this paragraph has, as a film, a dart drop value preferably of at least 190 g, more preferably of at least 200 g, if the film is extruded on a Collin film line into a thickness of 25 µm, with a die diameter of 30 mm, a die gap of 0.75 mm, a BUR (blow-up ratio) of 3.2.

In one more preferred composition the bimodal terpolymer comprises a low molecular weight copolymer fraction consisting in a homopolymer of ethylene and a high molecular weight copolymer fraction consisting in a terpolymer of ethylene, 1-butene and a $C_6$ to $C_{12}$ α-olefin. The melt flow rate $MFR_{21}$ of the final bimodal terpolymer is about 3 to 20 g/10 min and the density amounts to 955 to 965 kg/m³, whereby the low molecular weight ethylene polymer fraction has a melt flow rate $MFR_2$ of 300 to 1200 g/10 min. The amount of the low molecular weight copolymer fraction is 38 to 43% of the total composition and the amount of high molecular weight copolymer fraction is 57 to 62% of the total composition.

The film of the third embodiment consists in a medium molecular weight polymer having a relative narrow molecular weight distribution, whereby the film has moderate dart drop value accompanied by good optical properties. These films are mainly used in packaging where the strength is not a decisive factor but transparency is important.

The film according to the third embodiment consists of a bimodal terpolymer comprising
  a) a low molecular weight polymer which is a binary copolymer of ethylene and a $C_4$ to $C_{12}$ α-olefin and
  b) a high molecular weight polymer which is either a binary copolymer of ethylene and 1-butene, if the low molecular weight polymer of a) is a binary copolymer of ethylene and a $C_6$ to $C_{12}$ α-olefin, or a terpolymer of ethylene, 1-butene and a $C_6$ to $C_{12}$ α-olefin.

The bimodal terpolymer of the third embodiment can be produced in the same manner as already described in the first embodiment. This relates also to the catalyst types which can be used.

The bimodal terpolymer composition comprises as stated above a low molecular copolymer fraction and a high molecular copolymer fraction. The low molecular copolymer fraction contains a $C_4$ to $C_{12}$ α-olefin, which is preferably selected from the group of 1-butene, 1-hexene, 4-methyl-1-pentene, 1-octene and 1-decene. The $C_6$ to $C_{12}$ α-olefin of the high molecular weight copolymer fraction is preferably selected from the group of 1-hexene, 4-methyl-1-pentene, 1-octene and 1-decene.

The film according to the third embodiment if extruded on a Collin film line into a thickness of 25 µm, with a die diameter of 60 mm, die gap of 1.5 mm, BUR (blow-up ratio) of 2 and a frost line height of 120 mm, has a dart-drop value preferably over 50 g, more preferably over 60 g and most preferably over 63 g.

Further, the film with a dart-drop value as stated in the above paragraph has preferably haze value equal or less than 20, more preferably equal or less than 16, and has preferably a gloss value of at least 60, more preferably of at least 73.

The weight average molecular weight of the bimodal terpolymer is between 110,000 to 210,000 g/mol, preferably 120,000 to 200,000 g/mol. The low molecular weight polymer fraction has a weight average molecular weight preferably of 25,000 to 110,000 g/mol, more preferably of 30,000 to 100,000 g/mol and the high molecular weight polymer has a weight average molecular weight preferably of 100,000 to 400,000 g/mol, more preferably of 150,000 to 370,000 g/mol.

The final bimodal terpolymer has a melt flow rate $MFR_{21}$ preferably of 15 to 80 g/10 min, more preferably of 20 to 70 g/10 min. The low molecular weight polymer has a melt index $MFR_2$ preferably of 1 to 50 g/10 min, more preferably of 2 to 20 g/10 min.

The density of the final bimodal terpolymer is preferably of 900 to 935 kg/m³, more preferably of 915 to 930 kg/m³ and in particular 920 to 925 kg/m³. The density of the low molecular weight polymer is preferably of 925 to 950 kg/m³, more preferably of 930 to 940 kg/m³.

The film of the bimodal terpolymer according to the third embodiment, consists preferably in 30 to 60%, more preferably 35 to 50% and most preferably 38 to 45% by weight of low molecular weight copolymer with regard to the total composition.

The overall comonomer content in the total polymer is 1 to 7% by mol, preferably 2 to 6% by mol and in the low molecular weight polymer is the comonomer content 0.5 to 3.5% by mol, preferably 1 to 3% by mol. In the high molecular weight polymer is the comonomer content 3.5 to 10.5% by mol, preferably 4 to 10% by mol.

Further, the molecular weight of the high molecular weight copolymer fraction should be such that when the low molecular weight copolymer fraction has the melt index and density specified above, the final bimodal terpolymer has the melt index and density as discussed above.

In a further preferred composition the bimodal terpolymer comprises a low molecular weight copolymer fraction consisting in a binary copolymer of ethylene and 1-butene and a high molecular weight copolymer fraction consisting in a terpolymer of ethylene, 1-butene and a $C_6$ to $C_{12}$ α-olefin. The melt flow rate $MFR_2$ of the final bimodal terpolymer is about 0.5 to 2 g/10 min and the density amounts to 918 to 928 kg/m³, whereby the low molecular weight copolymer fraction has a melt flow rate $MFR_2$ of 2 to 20 g/10 min and a density of 930 to 950 kg/m³. The amount of the low molecular weight copolymer fraction is 38 to 43% of the total composition and the amount of the high molecular weight copolymer fraction is 57 to 62% of the total composition.

In addition to the bimodal terpolymer of all three described embodiments the composition may also contain antioxidants, process stabilizers, pigments and other additives known in the art.

Examples of stabilizers are hindered phenols, hindered amines, phosphates, phosphites and phosphonites.

Examples of pigments are carbon black, ultra marine blue and titanium dioxide.

Examples of other additives are e.g. clay, talc, calcium carbonate, calcium stearate, zinc stearate and antistatic additives like those sold under trademark name "Lanirostat".

The bimodal terpolymers according to all three embodiments may be produced using any known methods where ethylene is polymerized in the presence of a catalyst, preferably a Ziegler-Natta or single-site catalyst. They may be produced by a solution polymerization process, a slurry polymerization process or a gas polymerization process.

Preferably, the bimodal terpolymer is produced in a multi stage process like those disclosed in EP-B-0 517 868 and WO-A-96/18662. Preferably, the polymerization takes place either in the presence of a Ziegler-Natta catalyst like one of those disclosed in EP-A-0 688 794 and EP-A-0 949 274, or in the presence of a single-site catalyst like one disclosed in WO-A-97/28170.

Preferably, the low molecular weight copolymer fraction is produced in one stage of a multi stage polymerization process and the high molecular weight copolymer fraction in another stage of the process. More preferably, the low molecular weight copolymer fraction is produced in a continuously operating loop reactor where ethylene is polymerized in the presence of a polymerization catalyst as stated above and chain transfer agent such as hydrogen. The diluent is an inert aliphatic hydrocarbon, preferably isobutane or propane. A $C_4$ to $C_{12}$ α-olefin comonomer is preferably added to control the density of the low molecular weight copolymer fraction.

Preferably, the hydrogen concentration is selected so that the low molecular weight copolymer fraction has the desired melt flow rate. More preferably, the molar ratio of hydrogen to ethylene is between 0.1 and 1.0 mol/mol, most preferably, between 0.2 and 0.8 mol/mol.

In the case the target density of the low molecular weight copolymer fraction exceeds 955 kg/m³, it is advantageous to operate the loop reactor using propane diluent in so called supercritical conditions where the operating temperature exceeds the critical temperature of the reaction mixture and the operating pressure exceeds the critical pressure of the reaction mixture. A preferred range of temperature is then from 90 to 110° C. and the range of pressures is from 50 to 80 bar.

The slurry is intermittently or continuously removed from the loop reactor and transferred to a separation unit where the hydrocarbons including the eventually used $C_4$ to $C_{12}$ α-olefin comonomer and especially the chain transfer agents are separated from the polymer. The polymer containing the active catalyst is introduced into a gas phase reactor where the polymerization proceeds in the presence of additional ethylene, 1-butene and optional $C_4$ to $C_{12}$ α-olefin comonomer and optionally chain transfer agent to produce the high molecular weight copolymer fraction. The polymer is intermittently or continuously withdrawn from the gas phase reactor and the remaining hydrocarbons are separated from the polymer. The polymer collected from the gas phase reactor is the bimodal terpolymer.

The conditions in the gas phase reactor are selected so that the ethylene polymer has the desired properties. Preferably, the temperature in the reactor is between 70 and 100° C. and the pressure is between 10 to 40 bar. The hydrogen to ethylene molar ratio ranges from preferably 0.0001 to 0.02 mol/mol, more preferably 0.001 to 0.1 mol/mol and the α-olefin comonomer to ethylene molar ratio ranges from preferably 0.03 to 0.7 mol/mol, more preferably 0.04 to 0.6 mol/mol and most preferably 0.05 to 0.5 mol/mol.

In order to further illustrate the present invention preferred embodiments are given in the following by way of examples.

EXAMPLES

MFR

MFR was measured according to ISO 1133 at 190° C. The load has been indicated as a subscript, i.e. $MFR_2$ denotes the measurement has been carried out under a load of 2.16 kg and $MFR_{21}$ denotes the measurement has been carried out under a load of 21.6 kg, respectively.

FRR

Flow Rate Ratio (FRR) is a ratio of two melt flow rates, measured under different loads. The loads are denoted in the subscript. Thus, $FRR_{21/2}$ denotes the ratio of $MFR_{21}$ to $MFR_2$.

SHI

Shear Thinning Index (SHI) of polymers has been determined using Rheometrics RDA II Dynamic Rheometer. The measurements have been carried out at 190° C. temperature under nitrogen atmosphere. The measurements give storage modulus (G') and loss modulus (G") together with absolute value of complex viscosity ($\eta^*$) as a function of frequency ($\omega$) or absolute value of complex modulus (G*).

$$\eta^* = \sqrt{(G'^2 + G''^2)}/\omega$$

$$G^* = \sqrt{(G'^2 + G''^2)}$$

According to Cox-Merz rule complex viscosity function, $\eta^*(\omega)$ is the same as conventional viscosity function (viscosity as a function of shear rate), if frequency is taken in rad/s. If this empiric equation is valid, then absolute value of complex modulus corresponds shear stress in conventional (that is stedy state) viscosity measurements. This means that the function $\eta^*(\omega)$ is the same as viscosity as a function of shear stress.

In the present method viscosity at a low shear stress or $\eta^*$ at a low G* (which serve as an approximation of so called zero viscosity) is used as a measure of average molecular weight. On the other hand, shear thinning, that is the decrease of viscosity with G*, gets more pronounced the broader is molecular weight distribution. The property can be approximated by defining a so called shear thinning index, SHI, as a ratio of viscosities at two different shear stresses. In the examples below the shear stress (or G*) 0 and 100 kPa have been used. Thus:

$$SHI_{0/100} = \eta^*_0/\eta^*_{100}$$

where
$\eta^*_0$ is the zero shear rate viscosity
$\eta^*_{100}$ is the complex viscosity at G*=100 kPa.

As mentioned above storage modulus function, , G'($\omega$), and loss modulus function G"($\omega$), are obtained as primary functions from dynamic measurements. The value of the storage modulus at a specific value of loss modulus increase with broadness of molecular weight distribution. However this quantity is highly dependent on the shape of molecular weight distribution of the polymer. In the examples the value of G' at G"=5 kPa is used.

Density

Density was measured from compression moulded specimen at 23° C. in a water bath according to an ultrasound measurement method using Tecrad DS 500 equipment. The method was calibrated with samples having a density determinded according to ISO 1183.

Dart Drop

Dart drop was measured from film samples using the ISO 7765-1 method.

Gel Rating

The gel rating was observed visually from film samples. The samples were rated from -- (having a lot of gels) to ++ (having no or only a small number of gels).

Gloss

Gloss was measured according to ASTM D 2457v.

Haze

Haze was measured according to ASTM 1003.

Puncture

The puncture test was performed as follows. The film was mechanically clamped allowing circular testing area of diameter 50 mm. The film was then punctured by a striker (diameter 20 mm). The force and travel to the puncturing point were measured and the required energy was calculated. Travelling speed of the striker was 200 mm/min.

Molecular Weight

The molecular weight distribution is measured by using the size exclusion chromatography (SEC). In the examples this was done by using a Waters 150 CV plus no. 1115. A refractive index (RI) detector and a viscosity detector were used. The instrument was calibrated with a narrow molecular weight distribution polystyrene sample. The columns were 3 HT6E styragel from Waters at an oven temperature of 140° C.

Example 1

Into a 50 $dm^3$ loop reactor, operated at 70° C. temperature and 45 bar pressure, were continuously fed isobutane diluent, ethylene, 1-hexene comonomer, hydrogen, and a Ziegler-Natta Type polymerization catalyst (prepared according to example 3 of EP-A1-0 688 794) so that about 1.5 kg/h of polymer was formed.

The slurry was withdrawn from the reactor and introduced into another, 500 $dm^3$ loop reactor, operated at 80° C. temperature and 42 bar pressure, where additional isobutane, ethylene, 1-hexene and hydrogen were added, so that 32 kg/h of polymer having $MFR_2$ of 310 g/10 min and a density of 949 $kg/m^3$ was withdrawn from the reactor.

The polymer slurry was led into a flash tank, where the hydrocarbons were removed from the polymer. The polymer was then introduced into a fluidized bed gas phase reactor, where additional ethylene and hydrogen together with 1-butene comonomer were introduced.

From the gas phase reactor polymer was withdrawn at a rate of 81 kg/h. The powder was mixed with additives (Ca-stearate, antioxidant and process stabilizer) and compounded in a counterrotating twin screw extruder (JSW C1M90P extruder). The pelletized polymer had an $MFR_{21}$ of 27 g/10 min and a density of 923 kg/m³.

Comparative Example 1

The process of example 1 was repeated, except that 1-butene was used as a comonomer in the loop reactor instead of 1-hexene and propane was used as a diluent instead of isobutane. The data is shown in Table 1.

Examples 2 to 4

The process of Example 1 was repeated with slightly different process conditions. The material property can be found in Table 1.

TABLE 1

Properties of the polymers of Examples 1 to 4.

| | Example | | | | |
|---|---|---|---|---|---|
| | 1 | 2 | 3 | 4 | C.E. 1 |
| Loop $MFR_2$ (g/10 min.) | 310 | 550 | 320 | 300 | 300 |
| Loop density (kg/m³) | 949 | 941 | 954 | 949 | 950 |
| Split (% in GPR) | 59 | 59 | 58 | 59 | 59 |
| $MFR_{21}$ (g/10 min.) | 27 | 33 | 29 | 26 | 23 |
| $FRR_{21/2}$ | 27 | 24 | 22 | 24 | 25 |
| SHI(5/300) | 40 | 29 | 33 | 34 | 30 |
| Density (kg/m³) | 923 | 922 | 923 | 923 | 922 |

Example 5

The materials of the Examples 1 to 4 and Comparative to Example 1 were blown to a film of 25 μm thickness an a Collin film line, with a die diameter of 30 mm, a die gap of 0.75 mm, a BUR (blow-up ratio) of 3.2 and a frost line height of 160 mm. The results are shown in Table 2. They are referred to as Type 1 film materials.

TABLE 2

Type 1 film properties for a film prepared on an Collin laboratory line

| Polymer of Example | 1 | 2 | 3 | 4 | C.E. 1 |
|---|---|---|---|---|---|
| Gels − −/−/0/+/+ + | (+)+ | ++ | ++ | ++ | ++ |
| Dart drop (g) | >1700 | >1700 | >1700 | >1700 | 1040 |
| Puncture resist. energy (J) | 2.7 | 2.7 | 2.8 | 2.2 | N.M |
| Puncture resist. force (N) | 40 | 38 | 41 | 37 | N.M |
| Haze | 84 | 79 | 82 | 84 | N.M |
| Gloss | 9 | 10 | 9 | 9 | N.M |

N.M. denotes for not measured

Examples 6 to 7

The process of Example 1 was repeated except that 1-butene was used as a comonomer and propane as a diluent in the loop reactor and a mixture of 1-butene and 1-hexene was used as comonomers in a gas phase reactor. The process conditions were set to obtain materials according to Table 3.

Comparative Examples 2 to 3

The process of Comparative Example 1 was repeated except that the process conditions were set to produce the polymers according to Table 3.

TABLE 3

Properties of the polymers of Examples 6 to 7 and Comparative Examples 2 to 3

| | Example | | | |
|---|---|---|---|---|
| | 6 | 7 | C.E. 2 | C.E. 3 |
| Loop $MFR_2$ (g/10 min.) | 6 | 3 | 7 | 8 |
| Loop density (kg/m³) | 935 | 934 | 935 | 936 |
| Split (% in GPR) | 39 | 41 | 41 | 40 |
| Ratio of 1-butene to 1-hexene (mol/mol) | 0.11 | 0.19 | ∞ | ∞ |
| $MFR_{21}$ (g/10 min.) | 48 | 37 | 47 | 45 |
| $FRR_{21/2}$ | 32 | 38 | 43 | 42 |
| Density (kg/m³) | 925 | 924 | 923 | 922 |

Example 8

The procedure of Example 5 was repeated except that the film thickness was 25 μm, die diameter 60 mm, die gap 1.5 mm, BUR (blow-up ratio) 2 and frost line height 120 mm, and that the materials of Examples 6 to 7 and Comparative Examples 2 to 3 were used. The data is shown in Table 4. These are referred to as Type 2 film materials.

TABLE 4

Type 2 film properties an Collin laboratory line

| Polymer of Example | 6 | 7 | C.E. 2 | C.E. 3 |
|---|---|---|---|---|
| Gels − −/−/0/+/+ + | + | ++ | (+)+ | (+)+ |
| Dart drop (g) | 63 | 84 | 45 | 41 |
| Puncture resist. energy (J) | 3.6 | 4.7 | 3.0 | 3.1 |
| Puncture resist. force (N) | 51 | 59 | 41 | 41 |
| Haze | 15 | 15 | 16 | 16 |
| Gloss | 74 | 75 | 72 | 74 |

Example 9

Into a 50 dm³ loop reactor, operated at 70° C. temperature and 65 bar pressure, were continuously fed propane diluent, ethylene, hydrogen and Ziegler-Natta type polymerization catalyst (prepared according to Example 3 of EP-A-688794), so that about 1.5 kg/h of polymer was formed.

The slurry was withdrawn from the reactor and introduced into another, 500 dm³ loop reactor, operated at 95° C. temperature and 60 bar pressure, where additional propane, ethylene and hydrogen were added, so that 32 kg/h of ethylene homopolymer having $MFR_2$ of 450 g/10 min and density of 975 kg/m³ was withdrawn from the reactor.

The polymer slurry was led into a flash tank where the hydrocarbons were removed from the polymer. The polymer was then introduced into a fluidized bed gas phase reactor, operated at 75° C. temperature and 20 bar pressure, where additional ethylene and hydrogen, together with 1-butene and 1-hexene comonomers, were introduced. From the gas phase reactor polymer was withdrawn at a rate of 80 kg/h. The powder was mixed with additives (Castearate, antioxidant and process stabilizer) and compounded in a counterrotating twin screw extruder JSW CIM90P extruder. The palletized polymer had an $MFR_{21}$ of 7.5 g/10 min and density of 944 kg/m$^3$.

The data can be found in table 5.

Comparative Example 4

The process of Example 9 was repeated except that only 1-butene was used as a comonomer in the gas phase reactor. The data can be found in Table 5.

TABLE 5

Properties of the polymers of Example 9 and Comparative Example 4

|  | Example 8 | C.E. 4 |
|---|---|---|
| Loop MFR2 (g/10 min) | 450 | 660 |
| Loop density (kg/m$^3$) | 975 | 975 |
| Split (% in GPR) | 60 | 60 |
| $MFR_{21}$ (g/10 min) | 7.5 | 5.5 |
| $FRR_{21/5}$ | N.M. | 21 |
| SHI (5/300) | 67 | 70 |
| Density (kg/m$^3$) | 944 | 945 |

N.M. denotes for not measured

Example 10

The polymers of Example 9 and Comparative Example 4 were blown to films by using the equipment and procedure described in Example 5. The data is shown in Table 6.

TABLE 6

Type 1 film properties on Collin laboratory line

| Polymer of Example | 8 | C.E. 4 |
|---|---|---|
| Gels – –/–/0/+/+ + | — | — |
| Dart drop (g) | 308 | 279 |
| Tear resistance MD (N) | 0.08 | 0.08 |
| Tear resistance TD (N) | 2.6 | 2.6 |

The invention claimed is:

1. A film with high impact strength comprising a bimodal polymer including:
   a) a low molecular weight homopolymer of ethylene having a melt index $MFR_2$ of 200 to 800 g/10 min., and
   b) a high molecular weight terpolymer of ethylene, 1-butene and a $C_6$ to $C_{12}$ α-olefin.

2. A film with high impact strength comprising a bimodal polymer including:
   a) a low molecular weight polymer which is a binary copolymer of ethylene and a $C_4$ to $C_{12}$ α-olefin, and
   b) a high molecular weight polymer which is a terpolymer of ethylene, 1-butene and a $C_6$ to $C_{12}$ α-olefin.

3. A film according to claim 1, characterized in that the film if extruded on a Collin film line into a thickness of 25 μm, with a die diameter of 30 mm, a die gap of 0.75 mm, a BUR (blow-up ratio) of 3.2 and a frost line height of 160 mm, has a dart-drop value of at least 180 g.

4. A film according to claim 2, characterized in that the film if extruded on a Collin film line into a thickness of 25 μm, with a die diameter of 60 mm, die gap of 1.5 mm, a BUR (blow-up ratio) of 2 and a frost line height of 120 mm, has a dart-drop value of at least 50 g.

5. A film according to claim 1, characterized in that the film if extruded on a Collin film line into a thickness of 25 μm, with a die diameter of 30 mm, a die gap of 0.75 mm, a BUR (blow-up ratio) of 3.2 and a frost line height of 160 mm, has a dart-drop value of at least 1500 g.

6. A film according to claim 2, characterized in that the $C_4$ to $C_{12}$ α-olefin of the low molecular weight copolymer is 1-butene.

7. A film according to claim 1, characterized in that the $C_6$ to $C_{12}$ α-olefin of the high molecular weight terpolymer is selected from the group of 1-hexene, 4 methyl-1-pentene, 1-octene and 1-decene.

8. A film according to claim 4, characterized in that the film has a haze value equal or lower than 20 and a gloss value of at least 60.

9. A film according to claim 1, characterized in that the bimodal polymer has a weight average molecular weight of 190,000 to 400,000 g/mol.

10. A film according to claim 1, characterized in that the bimodal polymer has a weight average molecular weight of 240,000 to 500,000 g/mol.

11. A film according to claim 2, characterized in that the bimodal polymer has a weight average molecular weight of 110,000 to 210,000 g/mol.

12. A film according to claim 1, characterized in that the low molecular weight homopolymer has a weight average molecular weight of 4,500 to 55,000 g/mol and the high molecular weight terpolymer fraction has a weight average molecular weight of 450,000 to 1,000,000 g/mol.

13. A film according to claim 2, characterized in that the low molecular weight copolymer has a weight average molecular weight of 25,000 to 110,000 g/mol and the high molecular weight terpolymer has a weight average molecular weight of 150,000 to 400,000 g/mol.

14. A film according to claim 1, characterized in that the bimodal polymer has a melt flow rate $MFR_{21}$ of 7 to 40 g/10 min.

15. A film according to claim 1, characterized in that the bimodal polymer has a melt flow rate $MFR_{21}$ of 2 to 25 g/10 min.

16. A film according to claim 2, characterized in that the bimodal polymer has a melt flow rate $MFR_{21}$ of 15 to 80 g/10 min.

17. A film according to claim 2, characterized in that the low molecular weight copolymer has a melt index $MFR_2$ of 1 to 50 g/10 min.

18. A film according to claim 1, characterized in that the bimodal polymer has a density of 910 to 950 kg/m$^3$.

19. A film according to claim 1, characterized in that the bimodal polymer has a density of 935 to 970 kg/m$^3$.

20. A film according to claim 2, characterized in that the bimodal polymer has a density of 900 to 935 kg/m$^3$.

21. A film according to claim 1, characterized in that the low molecular weight homopolymer has a density of 940 to 980 kg/m$^3$.

22. A film according to claim 1, characterized in that the low molecular weight homopolymer has a density of 970 to 980 kg/m$^3$.

23. A film according to claim 2, characterized in that the low molecular weight copolymer has a density of 925 to 950 kg/m$^3$.

24. A film according to claim 1 characterized in that the low molecular weight homopolymer constitutes of 30 to 60% by weight of the total composition.

25. A film according to claim 1, characterized in that the comonomer content in the high molecular weight terpolymer is 2.5 to 11.0% per mol.

26. A film according to claim 1, characterized in that the comonomer content in the high molecular weight terpolymer is 0.5% to 3.5% per mol.

27. A film according to claim 2, characterized in that the comonomer content in the high molecular weight terpolymer is 3.5 to 10.5% per mol.

28. A process for producing a film with a high impact strength according to claim 2 whereby the process is a multi-stage process comprising a first reaction step wherein the low molecular weight polymer is produced and a second reaction step where the high molecular weight terpolymer is produced,
   characterized in that the first reaction step takes place in a slurry reactor whereby a slurry is formed from ethylene, a $C_4$ to $C_{12}$ α-olefin comonomer, an inert aliphatic hydrocarbon, a catalyst, and a chain transfer agent, wherein the ethylene and the $C_4$ to $C_{12}$ α-olefin are polymerized to produce the low molecular weight polymer; and
   subsequently, the slurry is removed from the reactor and transferred to a separation unit to separate the low molecular weight polymer and the catalyst from the inert aliphatic hydrocarbon, the chain transfer agent, and any remaining unreacted ethylene or α-olefin comonomer; and
   subsequently, the low molecular weight polymer and the catalyst are introduced into a gas phase reactor where the polymerization proceeds in the presence of additional ethylene, 1-butene, $C_6$ to $C_{12}$ α-olefin, and optional chain transfer agent to produce the high molecular weight polymer; and
   forming a film from the bimodal polymer.

29. A process according to claim 28 characterized in that the slurry reactor is a loop reactor.

30. A process according to claim 28 characterized in that the catalyst is a Ziegler-Natta or a single-site catalyst.

31. A process according to claim 28 characterized in that the inert aliphatic hydrocarbon is isobutane or propane.

32. A process according to claim 28 characterized in that the molar ratio of hydrogen to ethylene is between 0.1 and 1.0 mol/mol for producing the low molecular weight polymer.

33. A process according to claim 28 characterized in that the temperature in the gas phase reactor is between 70 to 100° C.

34. A process according to claim 28 characterized in that the pressure in the gas phase reactor is between 10 to 40 bar.

35. A process according to claim 28 characterized in that the molar ratio between hydrogen and ethylene is from 0.001 to 0.1 mol/mol.

36. A process according to claim 28 characterized in that the molar ratio of the α-olefin to ethylene is from 0.05 to 0.5 mol/mol.

37. A film according to claim 1 produced by a process comprising a first reaction step wherein the low molecular weight homopolymer is produced and a second reaction step where the high molecular weight terpolymer is produced
   characterized in that the first reaction step takes place in a slurry reactor whereby a slurry is formed from ethylene, an inert aliphatic hydrocarbon, a catalyst, and a chain transfer agent, wherein the ethylene is polymerized to produce the low molecular weight homopolymer; and
   subsequently, the slurry is removed from the reactor and transferred to a separation unit where the inert aliphatic hydrocarbon, the chain transfer agent, and any remaining unreacted ethylene are separated from the homopolymer and the catalyst; and
   subsequently, the polymer and the catalyst are introduced into a gas phase reactor where the polymerization proceeds in the presence of additional ethylene, 1-butene, $C_6$ to $C_{12}$ α-olefin, and optional chain transfer agent to produce the high molecular weight terpolymer.

38. A process for producing a film with a high impact strength according to claim 1 whereby the process is a multi-stage process comprising a first reaction step wherein the low molecular weight homopolymer is produced and a second reaction step where the high molecular weight terpolymer is produced,
   characterized in that the first reaction step takes place in a slurry reactor whereby a slurry is formed from ethylene, an inert aliphatic hydrocarbon, a catalyst, and a chain transfer agent, wherein the ethylene is polymerized to produce the low molecular weight homopolymer; and
   subsequently, the slurry is removed from the reactor and transferred to a separation unit where the inert aliphatic hydrocarbon, the chain transfer agent, and any remaining unreacted ethylene are separated from the homopolymer and the catalyst; and
   subsequently, the polymer and the catalyst are introduced into a gas phase reactor where the polymerization proceeds in the presence of additional ethylene, 1-butene, $C_6$ to $C_{12}$ α-olefin, and optional chain transfer agent to produce the high molecular weight terpolymer; and
   forming a film from the bimodal polymer.

39. A film according to claim 2 produced by a multi-stage process comprising a first reaction step wherein the low molecular weight polymer is produced and a second reaction step where the high molecular weight terpolymer is produced,
   characterized in that the first reaction step takes place in a slurry reactor whereby a slurry is formed from ethylene, a $C_4$ to $C_{12}$ α-olefin comonomer, an inert aliphatic hydrocarbon, a catalyst, and a chain transfer agent, wherein the ethylene and the $C_4$ to $C_{12}$ α-olefin are polymerized to produce the low molecular weight polymer; and
   subsequently, the slurry is removed from the reactor and transferred to a separation unit to separate the low molecular weight polymer and the catalyst from the inert aliphatic hydrocarbon, the chain transfer agent, and any remaining unreacted ethylene or α-olefin comonomer; and
   subsequently, the low molecular weight polymer and the catalyst are introduced into a gas phase reactor where the polymerization proceeds in the presence of additional ethylene, 1-butene, $C_6$ to $C_{12}$ α-olefin, and optional chain transfer agent to produce the high molecular weight polymer.

* * * * *